O. H. CHARTIER.
HARROW ATTACHMENT.
APPLICATION FILED AUG. 31, 1909.
968,834.
Patented Aug. 30, 1910.
2 SHEETS—SHEET 2.
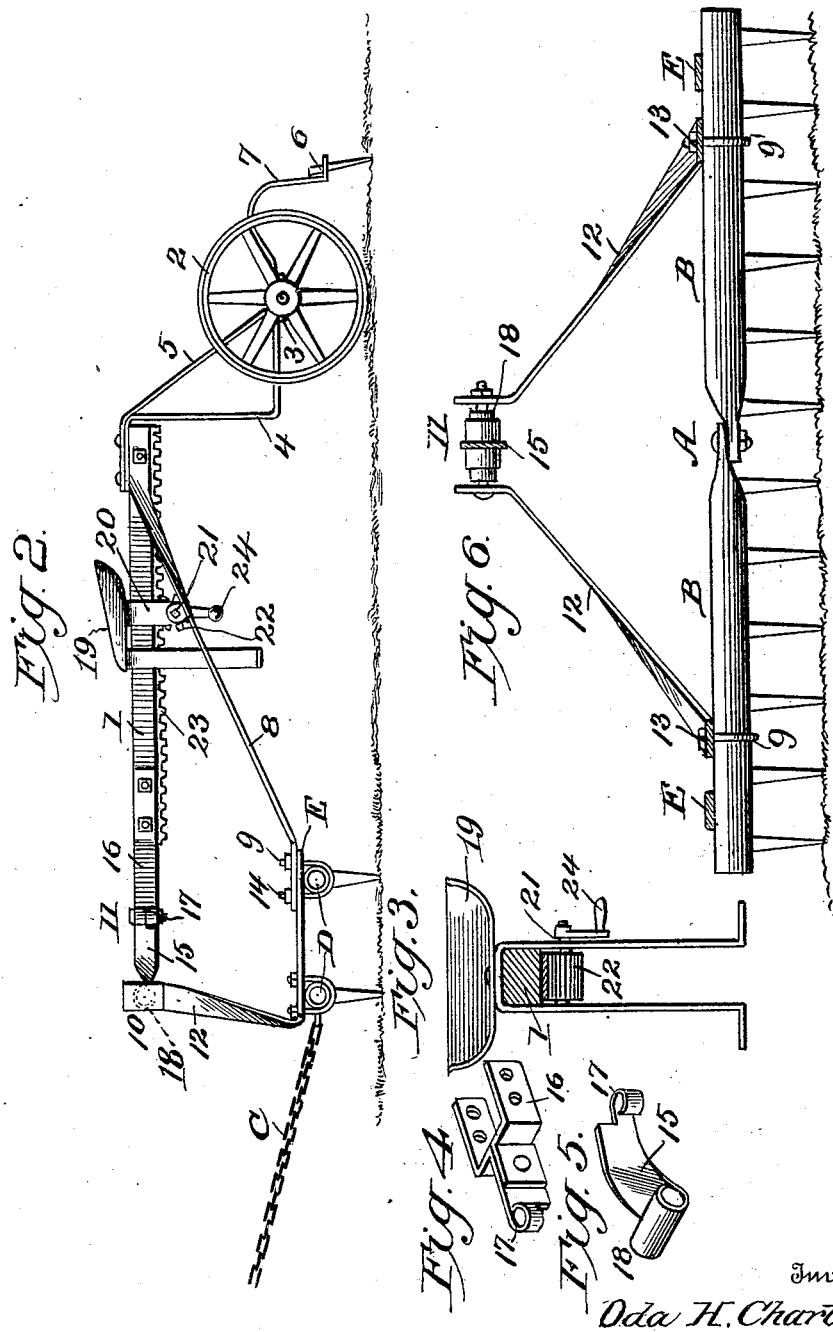
Witnesses
J. M. Fowler Jr.
E. M. Ricketts
Inventor
Oda H. Chartier
By Watson E. Coleman
Attorney

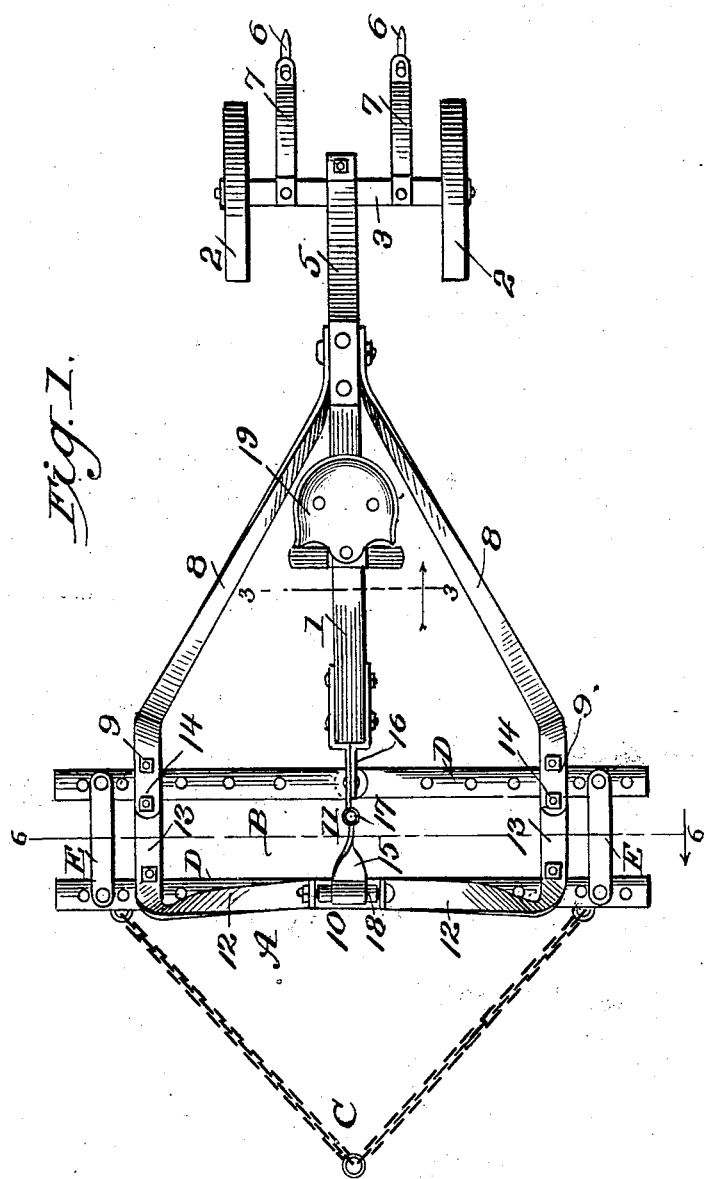

UNITED STATES PATENT OFFICE.

ODA H. CHARTIER, OF HENNESSEY, OKLAHOMA.

HARROW ATTACHMENT.

968,834.  Specification of Letters Patent.  Patented Aug. 30, 1910.

Application filed August 31, 1909.  Serial No. 515,445.

*To all whom it may concern:*

Be it known that I, ODA H. CHARTIER, a citizen of the United States, residing at Hennessey, in the county of Kingfisher and State of Oklahoma, have invented certain new and useful Improvements in Harrow Attachments, of which the following is a specification, reference being had to the accompanying drawings.

This invention relates to improvements in riding attachments for harrows and consists of the novel construction and arrangement of parts hereinafter fully described in the claims.

The object of the invention is to provide a device of this character which may be readily applied to a harrow or a plurality of harrow sections to support the driver, and which has improved means for adjusting the position of the driver's seat for the purpose of balancing the device.

The above and other objects of the invention are attained in the construction illustrated in the accompanying drawings in which—

Figure 1 is a top plan view of the invention showing it applied to a two section harrow. Fig. 2 is a side elevation. Fig. 3 is a cross sectional view. Figs. 4 and 5 are detail views of parts. Fig. 6 is a detail vertical section taken on the plane indicated by the line 6—6 in Fig. 1.

Referring more particularly to the drawings, A and B represent two harrow sections connected to a suitable draft device C. The harrow sections illustrated consist of longitudinal tooth-carrying bars D connected by forwardly and rearwardly extending bars E, but it will be understood that the invention may be applied to harrows of other form and construction.

My improved attachment comprises an elevated seat-carrying beam 1 extending forwardly and rearwardly and disposed slightly in rear of and higher than the harrow sections. The rear end of the beam 1 is supported by means of two ground wheels 2 mounted on a cross bar or axle 3 fixed at its center to the lower rear end of an angular hanger 4. The latter is attached to the rear portion of the beam 1 and strengthened by a diagonal brace 5.

6 denotes harrow teeth arranged on angular or offset brackets 7 attached to the cross bar 3, said teeth 6 being adapted to trail in rear of the wheels to loosen the ground over which they pass.

The front portion of the beam 1 is connected to and supported by the harrow sections. This is preferably effected by attaching to the opposite sides of the rear portion of the beam two outwardly diverging and downwardly inclined bars 8 which have their lower forward ends connected at 9 to certain of the longitudinal bars of the harrow sections. The supporting means for the front portion of the beam also consists of an upright arch shaped supporting member 10 connected to the longitudinal bars of the harrow sections and having its upper part connected by a universal swinging joint 11. The upright member 10 has downwardly extending portions or arms 12, the angular lower ends 13 of which are connected as indicated at 14 to the longitudinal bars of the harrow sections. The joint or connection 11 comprises two members 15, 16 pivotally connected to each other at 17, the rear member 16 being bolted to the front end of the beam 1, and the front member 15 being pivotally connected at 18 to the horizontal upper portion of the support or member 12.

19 denotes the driver's seat which is longitudinally adjustable on the beam 1 for the purpose of balancing the device. Said seat is fixed to the top of an inverted U-shaped slide 20 having depending arms, the lower ends of which are journaled to a transverse shaft 21. Fixed to the shaft is a cog wheel 22 to mesh with rack teeth 23 provided on the bottom face of the beam 1 and extending thereunder substantially from end to end. On one end of the shaft 21 is a crank handle 24 which when rotated causes the seat-carrying slide 20 to shift longitudinally of the beam.

From the foregoing description taken in connection with the accompanying drawings, it is thought that the construction, operation and advantages of the invention will be readily understood without a more extended explanation.

Having thus described the invention what I claim is:

1. A harrow attachment of the character described, comprising a forwardly and rearwardly extending beam, a harrow engaging means for supporting the front end of said beam, a wheel support for the rear end of said beam, a seat mounted for sliding movement longitudinally of the beam, and a rack and pinion device for actuating said seat.

2. A harrow attachment of the character described, comprising a forwardly and rearwardly extending beam, a harrow engaging means for supporting the front end of said beam, a wheel support for the rear end of said beam, a U-shaped slide to straddle the beam, a seat fixed to the top of said slide, a shaft journaled in the bottom of said slide, a longitudinal rack upon the bottom of the beam, a cog wheel upon the shaft to mesh with said rack, and a handle for rotating said shaft.

3. A harrow attachment comprising a seat supporting beam, a wheel support for the rear end of said beam, downwardly inclined and forwardly diverging bars extending from the beam and adapted to be connected to a harrow, an upright support for attachment to a harrow, and a flexible joint between said support and the front end of said beam.

In testimony whereof I hereunto affix my signature in the presence of two witnesses.

ODA H. CHARTIER.

Witnesses:
H. C. WAGGONER,
GEO. W. STURGEON.